Sept. 29, 1931.  L. W. BREHMAN  1,824,802
INSULATION TESTING SYSTEM

Filed Jan. 22, 1929

INVENTOR
L. W. Brehman
BY
ATTORNEY

Patented Sept. 29, 1931

1,824,802

UNITED STATES PATENT OFFICE

LUTHER W. BREHMAN, OF DETROIT, MICHIGAN, ASSIGNOR TO AMERICAN TELEPHONE AND TELEGRAPH COMPANY, A CORPORATION OF NEW YORK

INSULATION TESTING SYSTEM

Application filed January 22, 1929. Serial No. 334,226.

This invention relates to systems for testing the conductors of a cable in order to detect the presence of low insulation or high leakage.

In accordance with this invention an arrangement is provided for testing two or more conductors, composing one or more cables, to determine whether a leak has developed or whether the insulation resistance has decreased so as to render the system susceptible to failure for practical purposes.

A vacuum tube system acting as a detector is employed in connection with a sensitive relay and an alarm circuit for determining when trouble may develop, due to low insulation or high leakage, in two or more of the conductors forming one or more lines. The sensitive relay is connected in the output circuit of the vacuum tube system and controls the operation of the alarm circuit, an alarm being sounded whenever the insulation property of two or more of the conductors drops below a predetermined level.

It is one of the objects of this invention to provide a system for indicating poor insulation in a pair of conductors of a line by coupling these conductors to a vacuum tube system and a relay, so that when the insulation resistance of the conductors drops below a definite value the vacuum tube system will be energized sufficiently to cause the operation of the relay.

Figure 1:
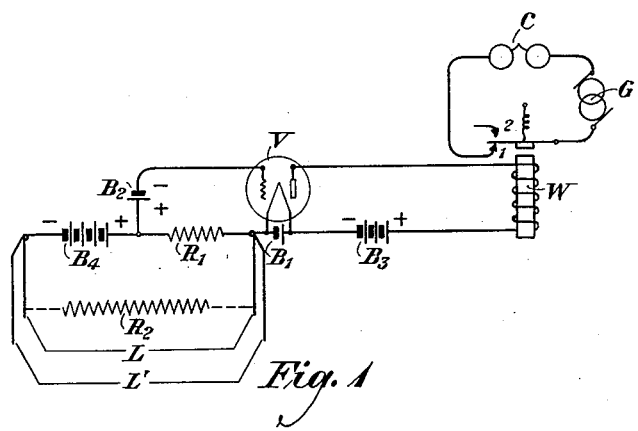

While this invention will be pointed out with particularity in the appended claim, the invention itself, both as to its further objects and features, will be better understood from the detailed description hereinafter following when read in connection with the accompanying drawings in which Figure 1 shows one embodiment of the invention and Fig. 2 a modification of the arrangement shown in Fig. 1.

Referring to Fig. 1 of the drawings, a vacuum tube system is shown including a vacuum tube V having plate, filament and grid electrodes. The filament electrode is heated to incandescence by means of a battery $B_1$. The grid electrode is connected to the filament electrode through a battery $B_2$ and a resistance $R_1$, battery $B_2$ being of such a potential and so poled as to render the grid electrode highly negative with respect to the filament electrode. The plate electrode is connected to the filament electrode through the winding of a relay W and a battery $B_3$, battery $B_3$ being so poled and of such a voltage as to render the plate electrode suitably positive with respect to the filament electrode.

The armature of relay W is free to move between two contacts, designated 1 and 2, and is normally biased against contact 2. In series with the armature and contact 1 there is a generator G and a ringer C. The generator G may be any source of alternating current, preferably one of low frequency, generating current of a frequency of, for example, twenty cycles. The ringer C may be a bell of the type familiar in telephony or any device responsive to the current produced by generator G. It will be clearly understood that while a ringer C is shown in series with generator G, the ringer representing an audible indicating device, a visible indicating device of any well known type may be substituted therefor or used in addition thereto without departing from the spirit and scope of this invention.

A battery $B_4$ is shown connected in series with resistance $R_1$. This battery may be a source of current of high voltage of any well known type. Two conductors forming a line L are connected in series relationship with battery $B_4$ and resistance $R_1$. Conductors of a similar line L' may be paralled with those of line L, and it will be understood that any number of lines may be similarly paralleled within the scope of this invention. This invention will be described hereinafter with reference to only one of the lines, L.

Under normal conditions the conductors forming line L representing an open circuit, and current cannot flow from battery $B_4$ through resistance $R_1$ and over these conductors. Under such conditions no voltage will be generated across the terminals of resistance $R_1$. The only voltage tending to bias the grid electrode of vacuum tube V negatively with respect to the filament electrode will be that derived from battery $B_2$.

In accordance with this invention the biasing voltage of battery $B_2$, or of any equivalent means, is made so high as to greatly impede the electronic emission from the filament electrode to the plate electrode. Thus, the flow of current from battery $B_3$ through the winding of relay W will be of a negligible magnitude. It is necessary to employ a sensitive relay herein, one which will not become operated when the current flowing from battery $B_3$ is of such low order. Relay W must be one which becomes operated only when the current flowing from battery $B_3$ is of a substantially higher magnitude. In other words, relay W must remain unoperated while the grid electrode of vacuum tube V is negative with respect to the filament electrode, by the voltage derived from battery $B_2$. Relay W must also be one which will become readily operated when the negativity of the grid electrode is substantially reduced or when the grid electrode is made somewhat positive with respect to the filament electrode.

When a condition of low insulation or high leakage develops between the conductors of line L or in any pair of conductors parallel thereto, the resistance between these conductors will not be infinite and therefore current will flow from battery $B_4$ through resistance $R_1$ and over these conductors. Resistance $R_2$ is one of finite magnitude, and represents that resistance present when the insulation between the conductors drops below a predetermined value or when the leakage increases to a corresponding extent. In fact, when a condition of low insulation or high leakage is developed, the conductors of line L may be short-circuited, in effect. In any event, current will flow from battery $B_4$ through resistance $R_1$ and over these conductors.

Battery $B_4$ is one of high voltage and is so poled as to render the left-hand terminal of resistance $R_1$ considerably more positive than the right-hand terminal. Accordingly, the voltage of battery $B_2$ will be opposed by that produced by resistance $R_1$. The voltage across resistance $R_1$ may greatly decrease the negative bias of the grid electrode with respect to the filament electrode so as to greatly reduce the impedance to electronic emission from the filament electrode to the plate electrode, or that voltage across resistance $R_1$ may be such as to even render the grid electrode somewhat positive with respect to the filament electrode. In either event, the electronic emission from the filament electrode to the plate electrode will be greatly increased, and the current from battery $B_3$ through the winding of relay W will be correspondingly increased. Inasmuch as relay W is one which is quite sensitive, its armature will be attracted and will close the associated contact 1. It is to be remembered that relay W is not caused to operate until the voltage produced by resistance $R_1$ either partly or completely overcomes that derived from battery $B_2$.

It will be apparent that after relay W has operated, current will flow from generator G through the ringer C, causing an audible signal. If a condition of low insulation or high leakage develops in any of the other pairs of conductors paralleling those of line L, relay W will operate and cause a similar audible signal at ringer C.

It is to be understood that while the arrangement of Fig. 1 is one in which the grid electrode of a vacuum tube system is made negative with respect to the filament electrode to prevent the flow of current through the winding of relay W under normal conditions, this grid electrode may be only slightly negative or somewhat positive with respect to the filament electrode, so that substantial current may flow through the winding of relay W under normal conditions. In the latter event battery $B_4$ must be so poled as to produce a voltage across resistance $R_1$ to overcome the slightly negative or somewhat positive bias of the grid electrode in order to render it highly negative and to cause relay W to become released.

Figure 2:
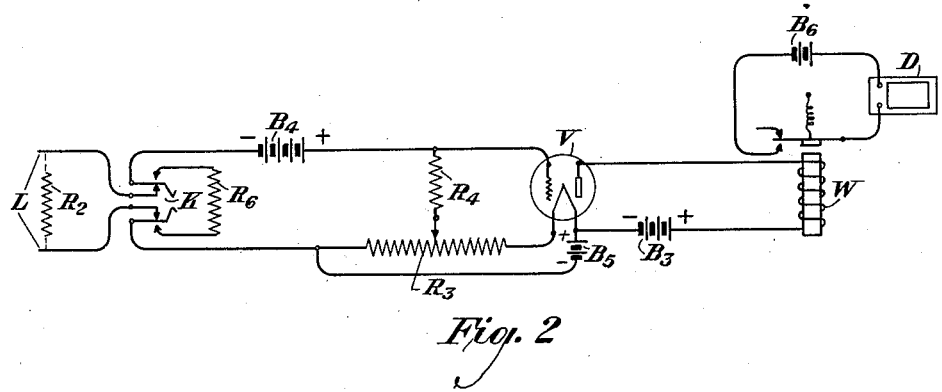

Fig. 2 shows a modification of the arrangement of Fig. 1. Here battery $B_5$ is connected in series with a resistance $R_3$ and the filament electrode of the vacuum tube V. A contact may be moved across resistance $R_3$ and this contact is connected to the grid electrode through a resistance $R_4$. The flow of current from battery $B_5$ causes a drop in voltage across the terminals of resistance $R_3$, and by the manipulation of the movable contact any portion of this voltage may be obtained to bias the grid electrode of vacuum tube V negatively with respect to the filament electrode to any desired extent. Under normal conditions no current flows through resistance $R_4$.

In the arrangement of Fig. 2 the line L is connected in series with the high voltage battery $B_4$, resistance $R_4$ and a portion of resistance $R_3$ through the inner contacts of a key K. The object in providing the variable contact on resistance $R_3$ is to permit an accurate adjustment to be made of the magnitude of the bias for the grid electrode of the vacuum tube in order that the tube may operate at the proper point in its characteristic curve and prevent the operation of relay W under normal conditions. By operating key K, a resistance $R_6$ of a definite and predetermined value will be connected in series relationship with battery $B_4$, resistance $R_4$ and a portion of resistance $R_3$. This resistance may have a value of, for example, three megohms, and may simulate the resistance between the conductors of a good line, i. e., a line of high insulation and low leakage.

The alarm circuit which is under the control of relay W may be of a type somewhat different from the one shown in the arrangement of Fig. 1. In Fig. 2 this alarm circuit includes a battery $B_6$ or other source of direct current, and a buzzer D or other visible or audible indicating means responsive to the flow of direct current. It will be clearly understood that the alarm circuit shown in Fig. 2 may be substituted for the one shown in Fig. 1, and that the circuit shown in Fig. 1 may be equally well substituted for the one shown in Fig. 2, within the scope of this invention.

While this invention has been shown in certain particular arrangements merely for the purpose of illustration, it will be clearly understood that the general principles may be embodied in other and widely varied organizations without departing from the spirit of the invention and the scope of the appended claim.

What is claimed is:

An arrangment for indicating the presence of low insulation or high leakage in the conductors of a line comprising a vacuum tube having plate, filament and grid electrodes, first, second and third batteries, first and second resistances, said first battery being connected in series with the filament of said vacuum tube and said first resistance, said second resistance being connected between the grid of said vacuum tube and a point movable along said first resistance so that only a predetermined portion of said first resistance may be connected in series with the grid and filament electrodes of said vacuum tube, said second battery being connected in series with the line and that portion of the first resistance not connected in series with the grid and filament electrodes of said vacuum tube, and a relay having a winding connected in series with said third battery and the plate and filament electrodes of said vacuum tube.

In testimony whereof, I have signed my name to this specification this 17th day of January, 1929.

LUTHER W. BREHMAN.